United States Patent
Pan et al.

(10) Patent No.: US 7,403,557 B2
(45) Date of Patent: Jul. 22, 2008

(54) APPARATUS AND METHOD FOR HYBRID TRAFFIC AND PILOT SIGNAL QUALITY DETERMINATION OF FINGER LOCK STATUS OF RAKE RECEIVER CORRELATORS

(75) Inventors: Li Pan, San Diego, CA (US); Jigneshkumar Shah, San Diego, CA (US); Fenghua Liu, San Diego, CA (US)

(73) Assignee: Nokia Corporation, Espoo (FI)

( * ) Notice: Subject to any disclaimer, the term of this patent is extended or adjusted under 35 U.S.C. 154(b) by 660 days.

(21) Appl. No.: 10/899,846

(22) Filed: Jul. 27, 2004

(65) Prior Publication Data

US 2006/0023774 A1    Feb. 2, 2006

(51) Int. Cl.
*H04B 1/69*    (2006.01)

(52) U.S. Cl. ................................. 375/148; 375/130

(58) Field of Classification Search ................. 375/148, 375/150, 130, 347, 316, 147; 324/614; 455/562.1, 455/513, 522
See application file for complete search history.

(56) References Cited

U.S. PATENT DOCUMENTS

| | | | |
|---|---|---|---|
| 5,648,983 A | 7/1997 | Kostic et al. |
| 5,754,583 A | 5/1998 | Eberhardt et al. |
| 5,818,866 A | 10/1998 | Wilk |
| 5,862,453 A | 1/1999 | Love et al. |
| 5,889,768 A | 3/1999 | Storm et al. |
| 6,078,611 A | 6/2000 | La Rosa et al. |
| 6,269,075 B1 | 7/2001 | Tran |
| 6,320,898 B1 | 11/2001 | Newson et al. |
| 6,345,078 B1 | 2/2002 | Basso |
| 6,370,183 B1 | 4/2002 | Newson et al. |
| 6,408,039 B1 | 6/2002 | Ito |
| 6,442,193 B1 | 8/2002 | Hirsch |
| 6,526,031 B1 | 2/2003 | Zaff et al. |
| 6,542,483 B1 | 4/2003 | Dinc et al. |
| 6,600,777 B1 | 7/2003 | Glazko |
| 6,625,197 B1 | 9/2003 | Lundby et al. |
| 6,711,420 B1 | 3/2004 | Amerga et al. |

(Continued)

FOREIGN PATENT DOCUMENTS

WO    WO 02/29996 A2    4/2002

OTHER PUBLICATIONS

*Enhanced Maximal Ratio Combining For Rake Receivers in Mobile CDMA Terminals*, K. Kettunen, Nokia, 5 pages.

(Continued)

*Primary Examiner*—Khai Tran
(74) *Attorney, Agent, or Firm*—Alston & Bird LLP

(57) ABSTRACT

Provided are improved systems and methods for spread spectrum communication employing hybrid Eb/No and pilot-based finger lock determination for RAKE receivers. Finger lock thresholds are periodically set using an extended time-averaged Eb/No traffic signal estimate for each finger mapped to an Ec/No pilot level, where the extended time-averaged Eb/No estimate is inversely proportional to the mapped Ec/No level, thus, decreasing the required Ec/No level when the Eb/No estimate increases and increasing the required Ec/No level when the Eb/No estimate decreases. Existing pilot-based finger lock algorithms may be used with the Ec/No threshold set using the extended time-averaged Eb/No estimate. When pilot signals are weak but traffic signals remain strong, fingers will remain locked to increase the combiner output signal-to-noise ratio.

35 Claims, 4 Drawing Sheets

U.S. PATENT DOCUMENTS

| | | | |
|---|---|---|---|
| 6,728,304 | B2 | 4/2004 | Brown et al. |
| 2001/0030948 | A1 | 10/2001 | Tiedemann, Jr. |
| 2002/0101909 | A1 | 8/2002 | Chen et al. |
| 2002/0105375 | A1 | 8/2002 | Sorokine |
| 2003/0142732 | A1 | 7/2003 | Moshavi et al. |
| 2003/0171136 | A1 | 9/2003 | Peng |
| 2003/0231701 | A1 | 12/2003 | Lugil |
| 2004/0063420 | A1 | 4/2004 | Hayata |

OTHER PUBLICATIONS

*Adaptive Step Size RAKE Receiver for DS/CDMA Communications Over a Rayleigh Fading Channel*, K. W. Wong et al., University of Leeds, 4 pages.

*RAKE Receiver with Adaptive Interference Cancellers for a DS-CDMA System in Multipath Fading Channels*, J. Yi et al., School of Electrical Engineering, Seoul National University, 5 pages.

*A RAKE Structured SINR Maximizing Mobile Receiver for the WCDMA Downlink*, M. Lenardi et al., Institut Eurecom, Sophia Antipolis Cedex, France, 5 pages.

*Estimation of Time-Varying Wireless Channels and Application to the UMTS W-CDMA FDD Downlink*, M. Lenardi et al., Institute Eurecom, Sophia Antipolis Cedex, France, 6 pages.

CDMA—Online, http://www.cdmaonline.com/interactive/workshops/terms1/1035.htm, Jul. 7, 2004, 2 pages.

CDMA—Online, http://www.cdmaonline.com/interactive/workshops/terms1/1043.htm, Jul. 8, 2004, 1 page.

CDMA—Online, http://www.cdmaonline.com/interactive/workshops/terms1/1078.htm, Jul. 8, 2004, 1 page.

CDMA—Online, http://www.cdmaonline.com/interactive/workshops/terms1/1030.htm, Jul. 8, 2004, 1 page.

*What's All This $E_b/N_o$ Stuff, Anyway?*, J. Pearce (With Apologies to Bob Pease), http://www.sss-mag.com/ebn0.html, 3 pages.

CDMA—Online, http://www.cdmaonline.com/interactive/workshops/terms1/1001.htm, Jul. 8, 2004, 2 pages.

CDMA—Online, http://www.cdmaonline.com/interactive/workshops/terms1/1020.htm, Jul. 8, 2004, 2 pages.

CDMA FAQ: Glossary, http://home.san.rr.com/denbeste/glossary.html, Jul. 8, 2004, 6 pages.

APPARATUS AND METHOD FOR HYBRID TRAFFIC AND PILOT SIGNAL QUALITY DETERMINATION OF FINGER LOCK STATUS OF RAKE RECEIVER CORRELATORS

FIELD OF THE INVENTION

The present invention relates generally to spread spectrum radio communications and, more particularly, to systems and methods for determining finger lock status of RAKE receiver finger processing elements, or combiners, in a Code Division Multiple Access (CDMA).

BACKGROUND

Code Division Multiple Access (CDMA) is a spread-spectrum communication technology that has become increasingly popular in mobile wireless communications systems, e.g., digital cellular radio systems. In a CDMA system, the time and frequency domains are simultaneously shared by all users as a base station simultaneously transmits distinct information signals to multiple subscriber mobile stations over a single frequency band. CDMA systems have a number of advantages over other multiple access systems, e.g., Frequency Division Multiple Access and Time Division Multiple Access, such as increased spectral efficiency and, as discussed below, the ability to mitigate the effects of signal fading using path diversity techniques.

Prior to transmission, a CDMA base station multiplies the individual information signal intended for each of the mobile stations by a unique signature sequence, referred to as a pseudorandom noise (PN) sequence. This PN sequence can be formed by multiplying a long pseudorandom noise sequence with a time offset which is used to differentiate the various base stations in the network, together with a short code unique to each mobile station, for example, the Walsh codes. The multiplication of the information signal by the signature sequence spreads the spectrum of the signal by increasing the rate of transmission from the bit rate to the chip rate. The spread spectrum signals for all subscriber mobile stations are then transmitted simultaneously by the base station. Upon receipt, each mobile station de-spreads the received spread spectrum signal by multiplying the received signal by the mobile station's assigned unique signature sequence. The result is then integrated to isolate the information signal intended for the particular mobile station from the other signals intended for other mobile stations. The signals intended for the other mobile stations appear as noise. The structure and operation of CDMA systems are well known. See, e.g., Andrew J. Viterbi, *CDMA: Principles of Spread Spectrum Communication*, Addison-Wesley Publishing, 1995; Marvin K. Simon, Jim K. Omura, Robert A. Scholtz, and Barry K. Levitt, *Spread Spectrum Communications Handbook*, McGraw-Hill, Inc., 1994.

One advantage of CDMA systems over other multiple-access telecommunications systems is the ability of CDMA systems to exploit path diversity of the incoming radio-frequency (RF) signal. The CDMA signal, including a pilot signal and traffic signals between a base station and mobile stations, is communicated from a transmitter to a receiver via a channel including several independent paths, referred to as multiple signals or "multipaths". Each multipath represents a distinct route that the information signal takes between the transmitter and receiver. The transmitted signal thus appears at the receiver as a plurality of multipath signals or multipaths. Each multipath may arrive at the receiver with an arbitrary timing delay, and each multipath may have a different signal strength at any time due to signal fading.

CDMA systems employ "RAKE" receivers in mobile units and base stations to exploit this path diversity. RAKE receivers estimate the timing delay introduced by each of one or more multipaths in comparison with some reference, e.g., line-of-sight delay, and then use the estimated timing delay to receive the multipaths which have the highest signal strength. A typical RAKE receiver includes a plurality of RAKE branches or "fingers", typically two to six fingers. Each finger is an independent receiver unit, often referred to as a correlator, which assembles and demodulates one received multipath which is assigned to the finger. A RAKE receiver also includes a separate "searcher" which searches out different signal components of an information signal that was transmitted using the assigned signature sequence of the receiver, and detects the phases of the different signal components. The timing of each finger is controlled such that it is correlated with a particular multipath which arrived at the receiver with a slightly different delay, as was found by the searcher in its receipt of the information signal. Thus, each finger is "assigned" to a particular multipath by controlling its timing to coincide with arrival of the multipath. The demodulated output from each finger, representing one multipath, is then combined into a high-quality output signal which combines the energy received from each multipath that was demodulated. The implementation of RAKE receivers is generally known for both forward and reverse CDMA channels. See, e.g., R. Price and P. E. Green, Jr., *A Communication Technique for Multipath Channels*, 46 Proc. Inst. Rad. Eng. 555-70 (March 1958); G. Cooper and C. McGillem, *Modern Communications and Spread Spectrum*, Chapter 12, McGraw-Hill, NY, 1986.

Finger lock algorithms are used to determine if signals of correlators of fingers in the RAKE should be used in a RAKE receiver combiner. Finger lock algorithms are based on various estimates of signal qualities. Typical finger lock algorithms are based simply on the pilot signal strength, such as an estimate of the ratio of pilot energy determined for pilot signal chips to interference received at the mobile station (Ec/Io) and measured by a finger, which indirectly is an estimate of the pilot energy determined for pilot signal chips to interference transmitted at the base station (Ec/Ior). For example, the Ec/Io of each finger in a RAKE receiver is estimated and used to determine if the finger should be used in combining. The determination of whether to use the finger or not is based upon a signal quality threshold. If the estimate Ec/Io of a finger is above the threshold, the finger is locked, meaning the signal on that finger path is used in the combiner. If the estimate Ec/Io of a finger is below the threshold, the finger is unlocked and the combiner will not use the data from the finger.

The threshold is determined to prevent adding noise to the combined signal. Thus, the threshold is typically established based upon a desired signal strength above a noise level. The result being that signal data is combined from any finger which can help to increase the combined SNR. If no signal exists on a path, having the finger locked would reduce the output SNR of the combiner. However, if a signal exists on an unlocked finger, the information would be lost to the combiner, reducing the output SNR of the combiner. One or more threshold values may be used for a logical decision to lock or unlock a finger. If a single threshold value is used, a finger is locked if its signal strength is estimated to be above the threshold and unlocked if below the threshold. To prevent a finger from fluctuating between lock and unlock status, two thresholds may be used, where a lock threshold is set greater than an unlock threshold and the finger remains in the current lock or unlock status between the two thresholds. For instance, if the finger is in an unlock position, the finger is not locked until the signal strength estimate reaches the higher lock threshold, and once the finger is locked, the finger is not unlocked until the signal strength estimate drops to the lower unlock threshold.

However, the signal strengths of pilot and traffic signals between a base station and mobile stations may vary and the ratio of the pilot signal strength to traffic signal strengths may vary. For example, the signal strengths of a pilot channel may remain constant, but the signal strengths of traffic channels may change based upon forward link power control bits sent by a mobile station to maintain a particular level of service at the mobile station. Thus, the forward traffic channel gain (FTCG) at the base station may constantly change. Similar signal strength of traffic channels vary when Fast Forward Power Control (FFPC) is enabled or with certain IS-2000 Forward Radio Configurations. For example, the pilot signal may be weak, but the traffic channel may be very strong and could contribute to the output SNR of a RAKE receiver combiner. Use of power measurement report messages (PMRM) in IS-95 could also result in strong traffic channel transmission signals in weak signal conditions. Thus, even in situations when a pilot signal strength may be very weak, significant and sufficient signals may be available on some multipaths due to forward power control which could improve demodulating forward link data. Further, typical RAKE receiver finger lock algorithms which are based on pilot strength estimates and thresholds set according to pilot strength estimates may result in fingers being unlocked when information on at least some multipaths could be used by a RAKE receiver combiner to increase output SNR.

Accordingly, there is a need in the art for a system and method for improved finger lock status determination for RAKE receiver combiners, particularly for use with fast forward power control systems.

SUMMARY

In light of the foregoing background, embodiments of the present invention provide improved systems and methods for finger lock status determination for RAKE receiver combiners. Finger lock determination of an embodiment of the present invention combines estimates of Eb/No having increased accuracy with pilot-based finger lock algorithms, also referred to herein as a hybrid Eb/No and pilot-based finger lock algorithm. A system or method for finger lock status determination of the present invention may be used with CDMA mobile communications, and may also be used for other spread spectrum communication applications and multipath receivers.

Eb/No generally refers to the signal strength of a traffic channel received by a finger of a RAKE receiver. More specifically, Eb/No is commonly defined as the ratio of energy per bit of a traffic channel (Eb) to the noise (No) on the finger. By comparison, Ec/No generally refers to the signal strength of the pilot channel and is commonly defined as the ratio of energy per chip of a pilot channel (Ec) to the noise (No) on the finger. The noise on the finger, No, refers to the noise after match filtering.

An embodiment of a method for determining finger lock status of the present invention may include the steps of determining an Eb/No estimate of a traffic channel on a finger of a RAKE receiver filtered over an extended period of time; setting a finger lock threshold of Ec/No inverse to the Eb/No estimate, determining and Ec/No estimate of a pilot channel; comparing the Ec/No estimate to the Ec/No finger lock threshold; and setting the finger lock status of the finger based upon the comparison. These steps, or subsets of these steps, may be periodically repeated to continue the wireless communication process. The Ec/No steps to lock or unlock the finger may be periodically repeated at a greater frequency than the Eb/No steps to set the finger lock threshold. The extended period of time to determine an Eb/No estimate may be, for example, greater than a power control group (PCG) which may be 1.25 milliseconds (ms), a fixed period of 20 ms, or one transmission frame. The estimate for Ec/No may be determined over one power control group (PCG) which may be 1.25 ms. The measurements of Eb/No used for the estimate of Eb/No may reuse the measurements of Eb/No for forward power control, such as Fast Forward Power Control (FFPC). Alternatively, the measurements of Eb/No for the estimate of Eb/No may be independent measurements taken over the extended period of time.

In an embodiment of a method for determining finger lock status of the present invention, a finger lock threshold set to an Ec/No level inverse to an Eb/No estimate may be mapped to decrease the Ec/No threshold when the Eb/No estimate increases and to increase the Ec/No threshold when the Eb/No estimate decreases. The inverse relationship between estimated Eb/No and an Ec/No finger lock threshold may be, for example, an inversely proportional, linear relationship, exponential relationship, or logarithmic relationship. Alternatively, the inverse relationship between estimated Eb/No and an Ec/No finger lock threshold may be, for example, mapped using pre-determined assignments or ranges of values for the Eb/No estimate and the Ec/No finger lock threshold. The inverse mapping may result in a Ec/No finger lock threshold which is less than a threshold level set using a purely pilot-based Ec/No threshold where the threshold is determined based principally upon measurements and estimates of Ec/No.

An embodiment of spread spectrum communication of the present invention may include the steps of transmitting a pilot channel and at least one traffic channel from a base station to a mobile station which receives the pilot channel and at least one of the traffic channels, combining the traffic channel on the mobile station using a RAKE receiver, and setting finger lock status of fingers of the RAKE receiver using a hybrid Eb/No and pilot-based finger lock determination. The step of setting finger lock status of fingers may be periodically repeated. In one embodiment of the present invention, the step of setting finger lock status of fingers of a RAKE receiver comprises the steps of determining an Eb/No estimate on each finger filtered over an extended period of time, setting an Ec/No finger lock threshold inverse to the Eb/No estimate for each finger, determining an Ec/No estimate of each finger, and comparing the Ec/No estimate of each finger to the Ec/No finger lock threshold of each finger. The extended period of time to determine an Eb/No estimate may be, for example, greater than a power control group (PCG) or a fixed period of 20 ms. The steps of determining an Eb/No estimate and setting a finger lock threshold of Ec/No may be periodically repeated. The steps of determining an Eb/No estimate and comparing the Ec/No estimate to the Ec/No finger lock threshold may be periodically repeated. The Ec/No steps to lock or unlock the finger may be periodically repeated at a greater frequency than the Eb/No steps to set the finger lock threshold.

In an embodiment of spread spectrum communication of the present invention, a finger lock threshold set to an Ec/No level inverse to an Eb/No estimate may be mapped to decrease the Ec/No threshold when the Eb/No estimate increases and to increase the Ec/No threshold when the Eb/No estimate decreases.

An embodiment of a spread spectrum communication system of the present invention may include a base station and a plurality of mobile stations. The mobile stations may include a RAKE receiver with multiple finger correlators and a hybrid Eb/No and pilot-based finger lock determinator. The RAKE receiver may include a combiner, a finger Eb/No measurer, and a finger Ec/No measurer. The derminator may include an Eb/No estimator, a threshold mapper, and an Ec/No estimator.

An embodiment of a mobile station of the present invention is provided which includes a spread spectrum RAKE receiver and a hybrid Eb/No and pilot-based finger lock determinator. The RAKE receiver may include a combiner, a finger Eb/No measurer, and a finger Ec/No measurer. The derminator may include an Eb/No estimator, a threshold mapper, and an Ec/No estimator.

An embodiment of a spread spectrum RAKE receiver of the present invention is provided which includes a combiner, multiple fingers, a finger Eb/No measurer, a finger Ec/No measurer, and a hybrid Eb/No and pilot-based finger lock determinator including an Eb/No estimator, a threshold mapper, and an Ec/No estimator.

These characteristics, as well as additional details, of the present invention are further described herein with reference to these and other embodiments.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention may be in the field of mobile phone communications, it will be appreciated from the following description that the invention is also useful for various other types of spread spectrum communications using RAKE receivers and multipaths in technologies other than mobile phone communications. Further, while a primary use of mobile stations of the present invention may be in the field of mobile phone technology, it will be appreciated from the following that many types of devices that are generally referenced herein as mobile stations, including, for example, mobile phones, pagers, handheld data terminals and personal data assistants (PDAs), portable personal computer (PC) devices, electronic gaming systems, global positioning system (GPS) receivers, satellites, and other portable electronics, including devices that are combinations of the aforementioned devices may be used to operate hybrid Eb/No and pilot based finger lock determination of the present invention.

As previously discussed, typically RAKE receivers operate to lock and unlock fingers based upon an estimate of the pilot Ec/No per finger. A RAKE receiver of the present invention operates to lock and unlock fingers based upon an extended time-averaged traffic Eb/No estimate per finger and a mapping of the Eb/No estimate to an Ec/No finger lock threshold level.

Eb/No generally refers to the signal strength of a traffic channel received by a finger of a RAKE receiver. More specifically, Eb/No is commonly defined as the ratio of energy per bit of a traffic channel (Eb) to the noise (No) on the finger. By comparison, Ec/No generally refers to the signal strength of the pilot channel and is commonly defined as the ratio of energy per chip of a pilot channel (Ec) to the noise (No) on the finger. The noise on the finger, No, refers to the noise after match filtering. One of ordinary skill in the art will understand that variations of traffic channel signal strength and pilot channel signal strength may be measured and estimated for finger lock status of a RAKE receiver. Accordingly, as used herein, Eb/No also includes the definitions of traffic channel signal strength of received-energy-per-bit-to-noise ratio and ratio of energy per bit to spectral noise density. Similarly, as used herein, Ec/No also includes the definition of pilot channel signal strength of total-received-energy-per-chip-to-noise ratio and radio of energy per chip to spectral noise density.

Figure 1:
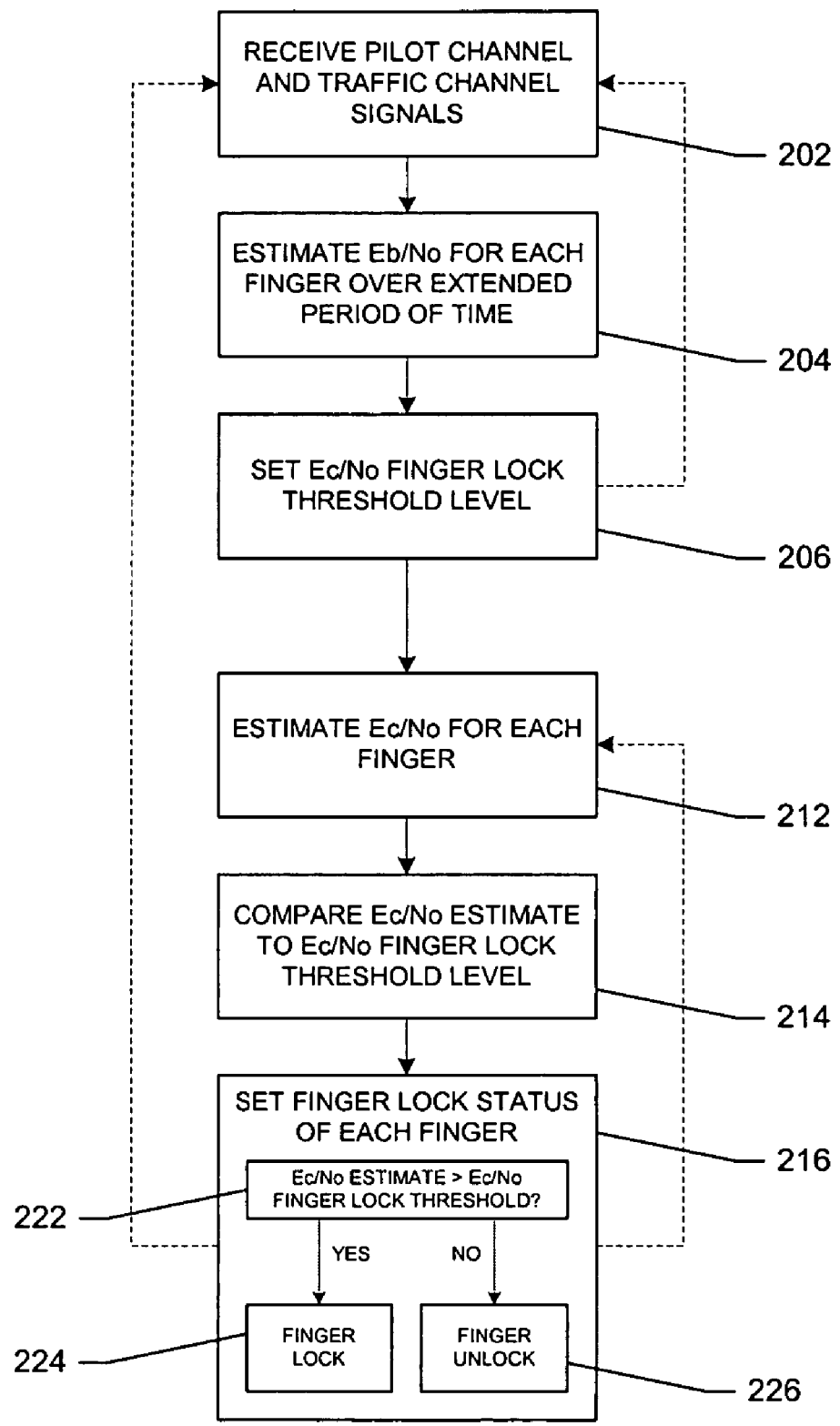
FIG. 1 is a flow chart of hybrid Eb/No and pilot-based finger lock determination of an embodiment of the present invention.

Referring now to FIG. 1, the present invention provides a hybrid Eb/No and pilot based finger lock determination. FIG. 1 shows a flow chart of an embodiment of the present invention. In order to perform a finger lock algorithm, a device must receive spread spectrum multipath transmission signals, such as a pilot channel and traffic channel signals 202. Once the signals are received, Eb/No is estimated 204. Finger lock status determination requires a reliable estimate of channel strength. And because Eb/No estimates determined for a power control group (PCG) or 1.25 ms tends to have considerable variance, finger lock status determination based upon Eb/No advantageously may use an estimate of Eb/No determined over an extended period of time, such as a frame length or 20 ms, although advantageously, Eb/No is determined over any period of time greater than the length of a power control group, 1.25 ms. The extended period of time may be determined based upon a desired increased accuracy of the Eb/No estimate with longer periods generally having increased accuracy but taking longer to acquire. The Eb/No estimate may reuse the Eb/No measurements acquired and/or estimates determined for Fast Forward Power Control (FFPC) typically estimated over the length of a power control group (PCG) or 1.25 ms.

The finger lock threshold is set 206 based upon the extended time-averaged Eb/No estimate. Because the determination of locking or unlocking a finger is made based upon an estimate of Ec/No, the finger lock threshold is set as an Ec/No level. And because mapping of Eb/No to an Ec/No finger lock threshold can occur at a faster rate than a frame, the period of Eb/No estimation may be adjusted based upon the desired quality of the Eb/No and/or Ec/No estimations. In accordance with the present invention, to prevent a finger from unlocking when sufficient signal strength is present, the Ec/No finger lock threshold is set inverse to the Eb/No estimate. Specifically, the relationship between the Eb/No estimate and the Ec/No finger lock threshold is an inverse relationship which may be, for example, an inversely proportional linear relationship, an inversely proportional exponential relationship, an inversely proportional logarithmic relationship, pre-determined inverse assignments of Eb/No and Ec/No values, and pre-determined inverse ranges of Eb/No and Ec/No values. As the Eb/No estimate increases, the Ec/No finger lock threshold decreases. As the Eb/No estimate decreases, the Ec/No finger lock threshold increases. If a strong Eb/No signal is detected, the finger should be locked or remain locked even where the pilot signal strength Ec/No estimate is weak. The process of setting an Ec/No finger lock threshold level 202, 204, 206 may periodically repeat during continued spread spectrum communications to update the finger lock threshold according to possibly changing conditions, such as changes of signal strength due to forward power control operations. One of ordinary skill in the art will recognize that setting the finger lock threshold level may actually involve setting a single finger lock threshold or setting more than one threshold, such as where different thresholds are set for finger lock and finger unlock. As used herein, setting a finger lock threshold includes situations where a single finger lock threshold level is used and situations where different thresholds are used for finger lock and finger unlock status.

Once the Ec/No finger lock threshold has been set based upon an extended time-averaged estimate of Eb/No for each finger, the Ec/No of each finger may be estimated and compared to the finger lock threshold. The finger lock status may be set based upon the finger lock threshold, which may be a single threshold level or multiple threshold levels. For example, if a single threshold value is used, a finger is locked if its Ec/No signal strength is estimated to be above the Ec/No threshold level and unlocked if below the threshold. If two thresholds are used to prevent a finger from fluctuating between lock and unlock status, the lock threshold is set greater than an unlock threshold and the finger remains in the current lock or unlock status between the two thresholds. For instance, if the finger is in an unlock position, the finger is not locked until the Ec/No signal strength estimate reaches the higher Ec/No finger lock threshold, and once the finger is locked, the finger is not unlocked until the Ec/No signal strength estimate drops to the lower Ec/No finger unlock threshold. Once the finger lock threshold is set using the extended time-averaged Eb/No estimate, conventional pilot-based finger lock algorithms may be employed. Accordingly, a hybrid Eb/No and pilot-based finger lock determination results where Eb/No is estimated over an extended period of time and the Eb/No estimate and the Ec/No threshold have an inverse relationship. Using Eb/No to set the finger lock threshold increases the accuracy of the finger lock threshold to ensure that the finger lock threshold is set low enough to capture situations when a strong traffic signal is received during periods of weak pilot signal strength. Using Ec/No to set the status of the fingers according to the finger lock threshold set using the Eb/No estimate permits the lock or unlock status of the finger to be verified or changed at small increments of time. Thus, Eb/No provides accuracy for the received signal strength and Ec/No provides the speed for locking and unlocking the fingers.

Figure 2:
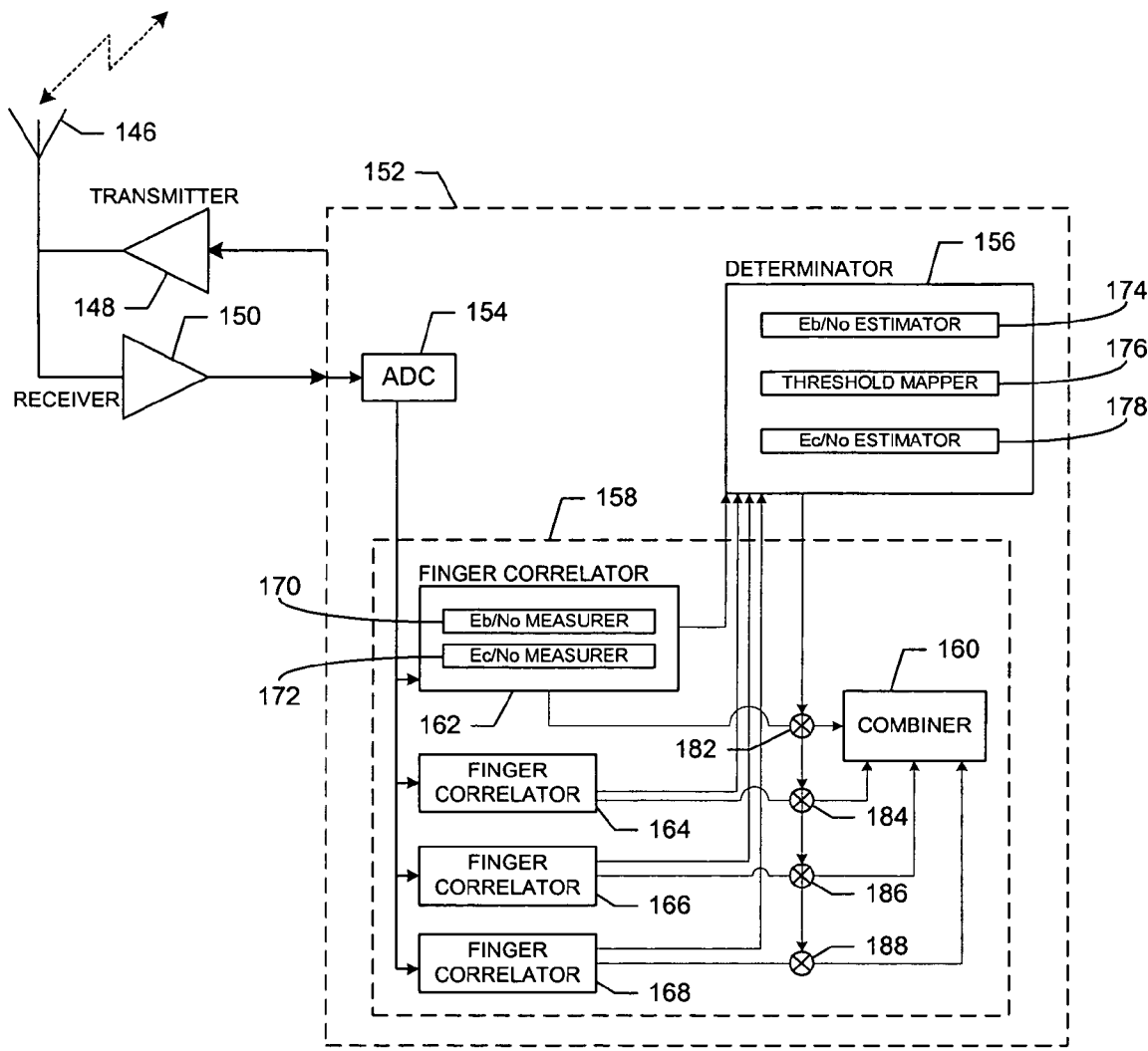
FIG. 2 is a block diagram of an entity capable of operating in accordance with hybrid Eb/No and pilot-based finger lock determination of an embodiment of the present invention.

FIG. 2 is a block diagram of an entity capable of operating in accordance with hybrid Eb/No and pilot-based finger lock determination of an embodiment of the present invention. The entity, such as a mobile device, may include a transmitter 148, a receiver 150, and a controller 152 that provides signals to and receives signals from the transmitter 148 and receiver 150, respectively. A controller may include a digital signal processor device, a microprocessor device, and various converters such as analog to digital converters and digital to analog converters, and other support circuits such as a spread spectrum RAKE receiver and a finger lock determinator. Elements of a controller may be hardware elements, software elements, or hardware and software elements. The controller 152 of FIG. 2 is shown including an analog to digital converter 154, a RAKE receiver 158, and a finger lock determinator 156. The RAKE receiver may be a typical configuration including multiple finger correlators 162, 164, 166, 168, typically from two to six fingers, each with a finger correlator lock and unlock switch 182, 184, 186, 188, and a combiner 160. Each finger correlator 162, 164, 166, 168 may include an Eb/No measurer 170 to determine the signal strength of the traffic channel per bit and an Ec/No measurer 172 to determine the signal strength of the pilot channel per chip as received by the finger. The controller 152 also includes a finger lock determinator 156 capable of operating in accordance with hybrid Eb/No and pilot based finger lock determination of the present invention. A finger lock determinator 156 may include an Eb/No estimator 174 for estimating the traffic channel signal strength over an extended period of time such as 20 ms, an Ec/No estimator 178 for estimating the pilot channel signal strength, and a threshold mapper 176 for mapping Eb/No estimates to Ec/No threshold levels based upon an inverse relationship which may be an inversely proportional linear relationship, an inversely proportional exponential relationship, an inversely proportional logarithmic relationship, pre-determined inverse assignments of Eb/No and Ec/No values, or pre-determined inverse ranges of Eb/No and Ec/No values. The finger correlators 162, 164, 166, 168 transmit signal strength information to the finger lock determinator 156 such that a comparison between the received pilot Ec/No and the set Ec/No finger lock threshold level may be made by the controller 152. The comparison may be made by the RAKE receiver 158, the determinator 156, or a separate element of the controller 152 such as a software routine. The comparison controls the lock or unlock status of finger correlator lock and unlock switches 182, 184, 186, 188, either directly controlled by the determinator 156 if making the comparison or indirectly by the determinator 156 if the comparison is made by another element of the controller 152 other than the determinator 156. The combiner 160 combines or sums the signals received by the fingers for any finger with a lock status.

Figure 3:
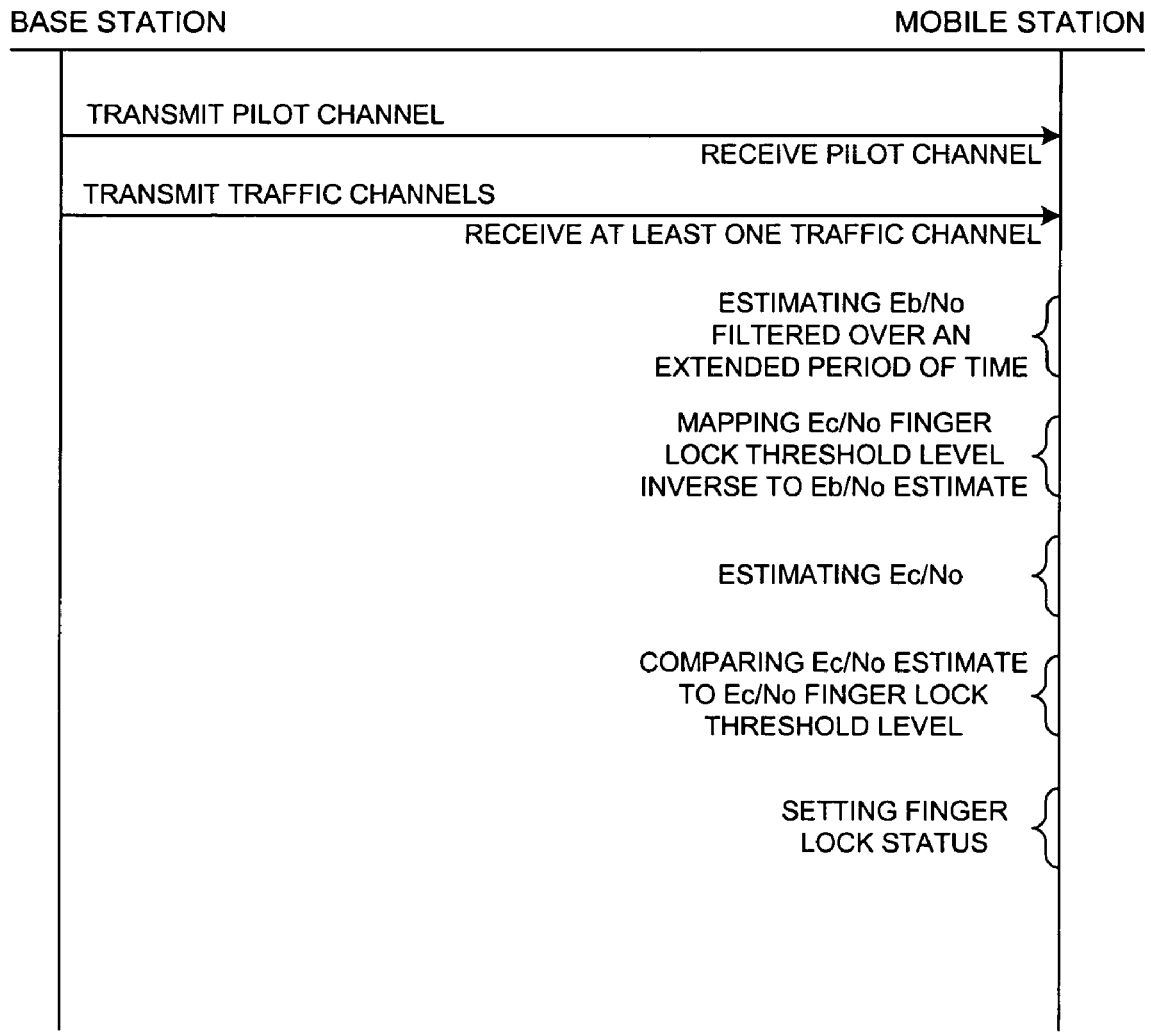
FIG. 3 is a control flow diagram illustrating a spread spectrum communication system operating in accordance with hybrid Eb/No and pilot-based finger lock determination of an embodiment of the present invention.

FIG. 3 is a control flow diagram illustrating a spread spectrum communication system operating in accordance with hybrid Eb/No and pilot-based finger lock determination of an embodiment of the present invention. A base station transmits a pilot channel to a mobile station which receives the pilot channel. The base station also transmits traffic channels to the mobile station which receives at least one of the traffic channels. The mobile station receives the signals using a RAKE receiver and combines the received signals from the RAKE receiver using a hybrid Eb/No and pilot-based finger lock determination. To perform the hybrid Eb/No and pilot-based finger lock determination for the finger correlators and the combiner, the mobile station estimates the received traffic signal strength, Eb/No, filtered over an extended period of time, advantageously greater than the length of a power control group (PCG), such as 20 ms. The mobile station then maps the Eb/No estimate to an Ec/No finger lock threshold based upon an inverse relationship between the Eb/No estimate and the Ec/No finger lock threshold. The inverse relationship may be various types of relationships as described further herein. The mobile station also estimates the received pilot signal strength, Ec/No, and compares the estimated Ec/No to the Ec/No finger lock threshold. Based upon the comparison of the estimated Ec/No to the Ec/No finger lock threshold, the mobile station sets the finger lock status of each finger in the RAKE receiver, such that the combiner of the RAKE receiver only sums the signals from fingers with a lock status.

Figure 4:
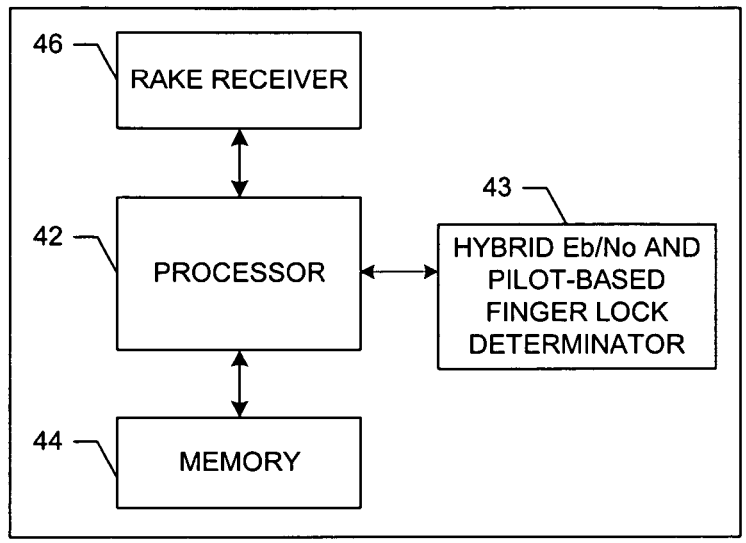
FIG. 4 is a block diagram of an entity capable of operating in accordance with hybrid Eb/No and pilot-based finger lock determination of an embodiment of the present invention.

Reference is now made to FIG. 4, which illustrates a block diagram of an entity capable of operating in accordance with hybrid Eb/No and pilot-based finger lock determination of one embodiment of the present invention. As shown, the entity capable of operating in accordance with hybrid Eb/No and pilot-based finger lock determination can generally include a processor, controller, or the like 42 connected to a memory 44. The processor can also be connected to at least one RAKE receiver 46 for receiving multipath communication channels transmitting data, content, or the like. The memory 44 can include volatile and/or non-volatile memory and typically stores content, data, or the like. For example, the memory 44 typically stores computer program code such as software applications or operating systems, information, data, content, or the like for the processor 42 to perform steps associated with operation of the entity in accordance with embodiments of the present invention. Also, for example, the memory 44 typically stores content transmitted from, or received by, the network node. Memory 44 may be, for example, random access memory (RAM), a hard drive, or other fixed data memory or storage device. The processor 42 may operate with a hybrid Eb/No and pilot-based finger lock determinator 43. Where the entity provides wireless communication, such as a CDMA mobile network, the processor 42 may operate with a wireless communication subsystem (not shown), such as a cellular transceiver, in communication with the RAKE receiver 46. One or more processors, memory, storage devices, and other computer elements may be used in common by a computer system and subsystems, as part of the same platform, or processors may be distributed between a computer system and subsystems, as parts of multiple platforms.

Figure 5:
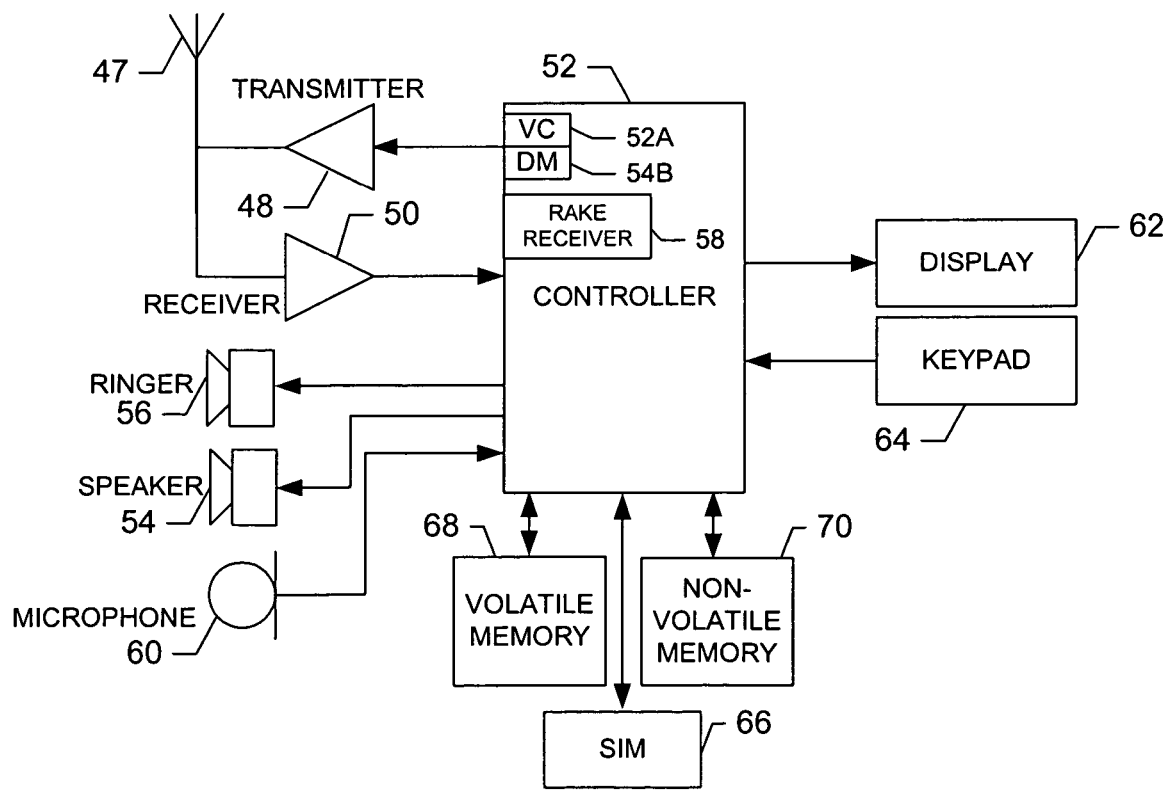
FIG. 5 is a block diagram of a mobile station capable of operating in accordance with hybrid Eb/No and pilot-based finger lock determination of an embodiment of the present invention.

FIG. 5 illustrates a functional diagram of a mobile device capable of operating in accordance with hybrid Eb/No and pilot-based finger lock determination of an embodiment of the present invention. It should be understood, that the mobile device illustrated and hereinafter described is merely illustrative of one type of mobile station that would benefit from the present invention and, therefore, should not be taken to limit the scope of the present invention or the type of devices which may operate in accordance with the present invention. While several embodiments of the mobile device are hereinafter described for purposes of example, other types of mobile stations, such as portable digital assistants (PDAs), pagers, laptop computers, and other types of voice and text communications systems, can readily be employed to function with the present invention.

The mobile device includes a transmitter 48, a receiver 50, and a controller 52 that provides signals to and receives signals from the transmitter 48 and receiver 50, respectively. These signals include signaling information in accordance with the air interface standard of the applicable cellular system, such as a pilot channel of a CDMA network, and also user speech and/or user generated data, such as transmitted by traffic channels of a CDMA network. In this regard, the mobile device can be capable of operating with one or more air interface standards, communication protocols, modulation types, and access types. More particularly, the mobile device can be capable of operating in accordance with any of a number of 1G, 2G, 2.5G and/or 3G communication protocols or the like. For example, the mobile device may be capable of operating in accordance with wireless communication protocol IS-95 (CDMA) and other spread spectrum communication protocols taking advantage of multipaths and RAKE receivers.

It is understood that the controller 52, such as a processor or the like, includes the circuitry required for implementing the video, audio, and logic functions of the mobile device. For example, the controller may be comprised of a digital signal processor device, a microprocessor device, and various analog to digital converters, digital to analog converters, and other support circuits. The control and signal processing functions of the mobile device are allocated between these devices according to their respective capabilities. The controller 52 thus also includes the functionality to convolutionally encode and interleave message and data prior to modulation and transmission. The controller 52 can additionally include an internal voice coder (VC) 52A, and may include an internal data modem (DM) 52B. A controller of a mobile device capable of operating in accordance with the present invention also includes a spread spectrum RAKE receiver 58 that operates to lock and unlock finger correlators of the RAKE receiver based upon a hybrid Eb/No and pilot based finger lock determination. Further, the controller 52 may include the functionality to operate one or more software applications, which may be stored in memory.

The mobile device may also comprise a user interface such as including a conventional earphone or speaker 54, a ringer 56, a microphone 60, a display 62, all of which are coupled to the controller 52. The user input interface, which allows the mobile device to receive data, can comprise any of a number of devices allowing the mobile device to receive data, such as a keypad 64, a touch display (not shown), a microphone 60, or other input device. In embodiments including a keypad, the keypad can include the conventional numeric (0-9) and related keys (#, *), and other keys used for operating the mobile device and may include a full set of alphanumeric keys or set of keys that may be activated to provide a full set of alphanumeric keys.

The mobile device can also include memory, such as a subscriber identity module (SIM) 66, a removable user identity module (R-UIM) (not shown), or the like, which typically stores information elements related to a mobile subscriber. In addition to the SIM, the mobile device can include other memory. In this regard, the mobile device can include volatile memory 68, as well as other non-volatile memory 70, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile device to implement the functions of the mobile device. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application, such as a software program or modules for an application, such as to implement the hybrid Eb/No and pilot-based finger lock determination of the present invention, and may store an update for computer program code for the mobile device.

One of ordinary skill in the art will recognize that the present invention may be incorporated into hardware and software systems and subsystems, combinations of hardware systems and subsystems and software systems and subsystems, and incorporated into network systems and mobile stations thereof. In each of these systems and mobile stations, as well as other systems capable of using a system or performing a method of the present invention as described above, the system or mobile station generally may include a computer system including one or more processors that are capable of operating under software control to provide the techniques described above, including performing hybrid Eb/No and pilot based finger lock determination.

Computer program instructions for software control for embodiments of the present invention may be loaded onto a computer or other programmable apparatus to produce a machine, such that the instructions which execute on the computer or other programmable apparatus create means for implementing the functions described herein, such as a mobile station employing a RAKE receiver with correlators locked and unlocked using a hybrid Eb/No and pilot based finger lock determination. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions described herein, such as a method for determining finger lock status of finger correlators of a RAKE receiver based upon hybrid Eb/No and pilot channel signal strength. It will also be understood that each block or element, and combinations of blocks and/or elements, can be implemented by hardware-based computer systems, software computer program instructions, or combinations of hardware and software which perform the specified functions or steps of hybrid Eb/No and pilot-based finger lock determination.

Herein provided and described are improved systems and methods for determining finger lock status based upon hybrid Eb/No and pilot based finger lock algorithms. Finger lock thresholds of embodiments of the present invention are periodically set using an extended time-averaged Eb/No traffic signal estimate for each finger mapped to an Ec/No pilot level, where the extended time-averaged Eb/No estimate is inversely proportional to the mapped Ec/No level, thus, decreasing the required Ec/No level when the Eb/No estimate increases and increasing the required Ec/No level when the Eb/No estimate decreases. Existing pilot-based finger lock algorithms may be used with the Ec/No threshold set using the extended time-averaged Eb/No estimate of embodiments of the present invention. When pilot signals are weak but traffic signals remain strong, fingers of embodiments of the present invention will remain locked to increase the combiner output signal-to-noise ratio.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of determining finger lock status of a finger of a RAKE receiver, comprising the steps of:
   determining an Eb/No estimate of a traffic channel on said finger filtered over a first time period for finger lock determination;
   setting a finger lock threshold of Ec/No inverse to said Eb/No estimate;
   determining an Ec/No estimate of a pilot channel filtered over a second time period;
   comparing said Ec/No estimate to said Ec/No finger lock threshold; and
   setting said finger lock status of said finger based upon said comparison of said Ec/No to said Ec/No finger lock threshold.

2. The method of claim 1, further comprising the step of periodically repeating said steps of determining an Eb/No estimate and setting a finger lock threshold of Ec/No.

3. The method of claim 1, further comprising the step of periodically repeating said steps of determining an Ec/No estimate, comparing said Ec/No estimate to said Ec/No finger lock threshold, and setting said finger lock status of said finger.

4. The method of claim 3, further comprising the step of periodically repeating said steps of determining an Eb/No estimate and setting a finger lock threshold of Ec/No, wherein said period for repeating setting finger lock status of said finger is less than said period for repeating setting a finger lock threshold of Ec/No.

5. The method of claim 1, further comprising the step of periodically repeating said steps of determining an Eb/No estimate, setting a finger lock threshold of Ec/No, determining an Ec/No estimate, comparing said Ec/No estimate to said Ec/No finger lock threshold, and setting said finger lock status of said finger.

6. The method of claim 1, wherein said first time period is greater than one power control group (PCG).

7. The method of claim 6, wherein one power control group is 1.25 ms.

8. The method of claim 1, wherein said first time period is 20 ms.

9. The method of claim 1, wherein said first time period is one frame.

10. The method of claim 1, wherein said second time period is greater than the length of one chip.

11. The method of claim 10, wherein said second time period is 1.25 ms.

12. The method of claim 1, further comprising the step of determining an Eb/No estimate over a power control group (PCG) for Fast Forward Power Control (FFPC), wherein said estimate of Eb/No for FFPC is used to determine said Eb/No estimate for finger lock determination.

13. The method of claim 1, wherein said step of setting a finger lock threshold sets an Ec/No threshold less than a purely pilot-base Ec/No threshold.

14. The method of claim 1, wherein said step of setting a finger lock threshold comprises mapping an Ec/No threshold based upon said Eb/No estimate.

15. The method of claim 14, wherein said mapping decreases said Ec/No threshold when said Eb/No estimate increases and increases said Ec/No threshold when said Eb/No estimate decreases.

16. The method of claim 15, wherein said mapped relationship of Ec/No threshold to Eb/No estimate is selected from the group consisting of: an inversely proportional, linear relationship; an inversely proportional, exponential relationship; an inversely proportional, logarithmic relationship, pre-determined inverse assignments of values, and pre-determined inverse ranges of values.

17. A method of spread spectrum communication, comprising the steps of:
   receiving a pilot channel and at least one traffic channel;
   combining a traffic channel on said mobile station using a RAKE receiver; and
   setting finger lock status of fingers of said RAKE receiver using a hybrid Eb/No and pilot-based finger lock determination, wherein setting finger lock status comprises:
      determining an Eb/No estimate for at least one of said fingers; and
      setting and Ec/No finger lock threshold based upon said Eb/No estimate.

18. The method of claim 17, further comprising the step of transmitting said pilot channel and said at least one traffic channel from a base station.

19. The method of claim 17, wherein a mobile station receives said pilot channel and said at least one traffic channel transmitted from a base station.

20. The method of claim 17, further comprising the step of periodically repeating the step of setting finger lock status of fingers of said RAKE receiver.

21. The method of claim 17, wherein said step of setting finger lock status comprises the steps of:
   determining an Eb/No estimate of each finger filtered over a first time period for finger lock determination;
   setting a finger lock threshold of Ec/No inverse to said Eb/No estimate of each finger;
   determining an Ec/No estimate of each finger filtered over a second time period; and
   comparing said Ec/No estimate of each finger to said Ec/No finger lock threshold of each finger.

22. The method of claim 21 wherein said first time period is greater than one power control group (PCG).

23. The method of claim 21, wherein said first time period is 20 ms.

24. The method of claim 21, further comprising the step of periodically repeating said steps of determining an Eb/No estimate and setting a finger lock threshold of Ec/No.

25. The method of claim 21, further comprising the step of periodically repeating said steps of determining an Eb/No estimate and comparing said Ec/No estimate to said Ec/No finger lock threshold.

26. The method of claim 25, further comprising the step of periodically repeating said steps of determining an Eb/No estimate and setting a finger lock threshold of Ec/No, wherein said period for repeating setting finger lock status of said finger is less than said period for repeating setting a finger lock threshold of Ec/No.

27. The method of claim 21, wherein said step of setting a finger lock threshold comprises mapping an Ec/No threshold based upon said Eb/No estimate.

28. The method of claim 27, wherein said mapping decreases said Ec/No threshold when said Eb/No estimate increases and increases said Ec/No threshold when said Eb/No estimate decreases.

29. A spread spectrum communication system, comprising:
   a base station comprising a spread spectrum transceiver for transmitting and receiving wireless communication signals on a plurality of paths; and
   a plurality of mobile stations communicably connected to said base station and individually comprising:
      a spread spectrum RAKE receiver with at least two finger correlators; and
      a hybrid Eb/No and pilot-based finger lock determinator for determining an Eb/No estimate for at least one of said fingers and setting Ec/No finger lock threshold based upon said Eb/No estimate.

30. The system of claim 29, wherein said RAKE receiver comprises:
   a combiner coupled to said finger correlators;
   a finger Eb/No measurer coupled to each of said finger correlators; and
   a finger Ec/No measurer coupled to each of said finger correlators.

31. The system of claim 29, wherein said hybrid Eb/No and pilot-based finger lock determinator comprises:
   an Eb/No estimator coupled to said RAKE receiver;
   a threshold mapper coupled to said Eb/No estimator; and
   an Ec/No estimator coupled to said RAKE receiver.

32. A mobile station, comprising:
   a spread spectrum RAKE receiver with at least two fingers; and
   a hybrid Eb/No and pilot-based finger lock determinator, for determining an Eb/No estimate for at least one of said fingers and setting Ec/No finger lock threshold based upon said Eb/No estimate, interoperably coupled to said RAKE receiver.

33. The mobile station of claim 32, wherein said RAKE receiver comprises:
   a combiner coupled to said finger correlators;
   a finger Eb/No measurer coupled to each of said finger correlators; and
   a finger Ec/No measurer coupled to each of said finger correlators.

34. The mobile station of claim 32, wherein said hybrid Eb/No and pilot-based finger lock determinator comprises:
   an Eb/No estimator coupled to said RAKE receiver;
   a threshold mapper coupled to said Eb/No estimator; and
   an Ec/No estimator coupled to said RAKE receiver.

35. A spread spectrum RAKE receiver, comprising:
   a combiner;
   two or more finger correlators individually coupled to said combiner;
   a finger Eb/No measurer coupled to said each of said finger correlators;
   a finger Ec/No measurer coupled to said each of said finger correlators; and
   a hybrid Eb/No finger lock determinator coupled to said finger correlators, comprising:
   an Eb/No estimator coupled to said finger Eb/No measurer;
   a threshold mapper coupled to said Eb/No estimator; and
   an Ec/No estimator coupled to said finger Ec/No measurer.

* * * * *